J. L. GRAY.
PROCESS OF TREATING PETROLEUM SLUDGE TO PRODUCE PITCH, ASPHALT, &c.
APPLICATION FILED JUNE 24, 1905.
923,427.
Patented June 1, 1909.
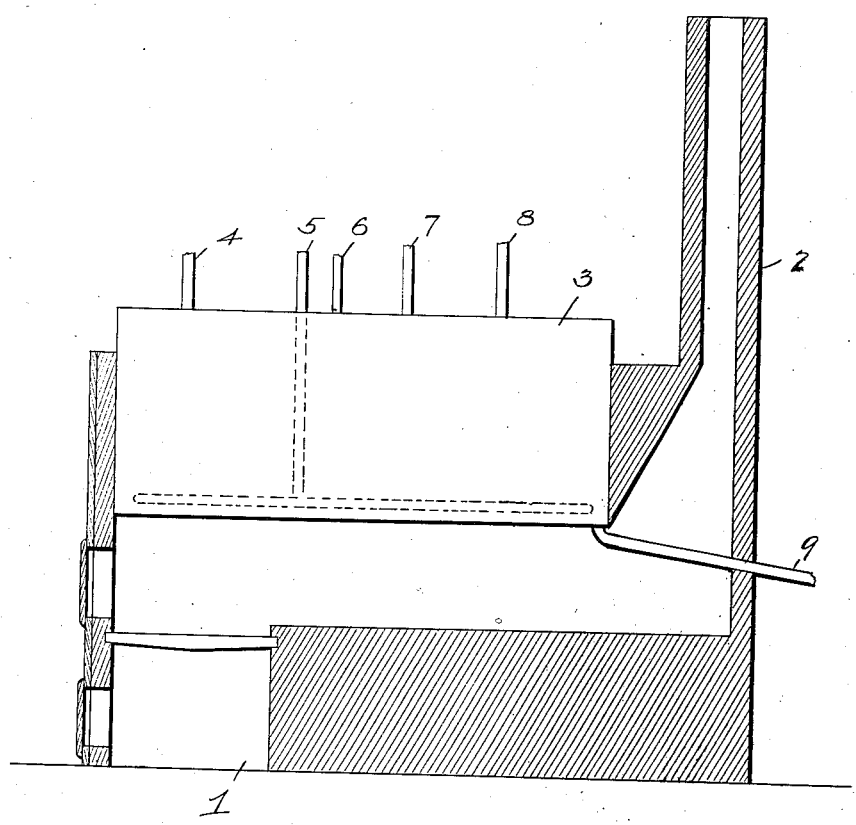

UNITED STATES PATENT OFFICE.

JOHN LATHROP GRAY, OF ELIZABETH, NEW JERSEY.

PROCESS OF TREATING PETROLEUM SLUDGE TO PRODUCE PITCH, ASPHALT, &c.

No. 923,427.     Specification of Letters Patent.     Patented June 1, 1909.

Application filed June 24, 1905. Serial No. 266,763.

*To all whom it may concern:*

Be it known that I, JOHN LATHROP GRAY, a citizen of the United States, residing at Elizabeth, in the county of Union and State of New Jersey, have invented certain new and useful Improvements in Processes of Treating Petroleum Sludge to Produce Pitch, Asphalt, &c.; and I do hereby declare the following to be a full, clear, and exact description of the invention, such as will enable others skilled in the art to which it appertains to make and use the same.

My invention relates to a process of treating petroleum sludge to produce pitch or asphaltum, that is to say, such acid sludges as result after washing the distillates or derivatives thereof produced in refining crude petroleum or petroleum tar.

For many years petroleum sludge was a waste product of the most difficult and undesirable nature. It could not be disposed of by a sewerage or any of the ordinary methods of disposition in the neighborhood of cities, and in addition to being a waste it was a feature of expense, requiring special provisions for dumping it at some distant point.

None of the methods of treatment which has been successful in obtaining by-products from coal tar has been effective with petroleum sludge. It has been necessary, in fact, to resort to the use of a fluxing agent to obtain any results from the treatment of this residuum.

I have discovered a method of treating the sludge to secure valuable commercial products without employing any additional or fluxing agent; and my process is especially applicable to the sludge immediately as it is produced in the oil treating plant.

In a companion application, Serial No. 266,765, I have described and claimed a process of removing acid from this petroleum sludge, and it is a feature of my process of forming pitch that I take advantage of this preliminary process of separating a large part of the acid from the sludge to produce thereby a substance which I can treat by simple processes to produce pitch or asphaltum. In my acid recovering process I separate the weak acid from the acid sludge in, for example, two digestings, using the accumulated weak acid in digesting a succeeding body of acid sludge. This particular treatment is, however, not essential, it being merely essential that the acid should be removed either by my process or by washing or digesting the sludge several times by means of water and steam in the ordinary manner until something between 50 to 80 per cent. of the acid has been removed. The digesting process in either case is the same so far as the operations are concerned, the difference being merely in the medium used.

In carrying out my process, after the sludge has been properly digested to remove the acid I place it in a suitable still and, while stirring it with a suitable mixing apparatus, heat it. In heating I prefer to employ fire of an external heating device until I have brought the temperature beyond the condensing point of steam, at which point steam is allowed to enter the mass of hot sludge through a suitable spray pipe that is preferably arranged on the bottom of the still. I may use either steam or air or I may use steam and air combined. Such a gaseous medium is not essential but is one which leads to an improved quality in the product.

While an apparatus such as described employing familiar devices may be used a still is sufficient for carrying out this process as it is not essential to either stir or use the spray pipe.

Whatever form of heating I employ I allow the temperature to rise until the mass is converted into a pitch.

In another companion application, Serial No. 266,764 I have described and claimed a process of separating the sludge into grades which consists in digesting the acid sludge until the mass separates into divisions of lighter sludge, weak acid and heavy residuum, and in that process as well as in the acid process have recited as a preliminary step pumping off any mechanically entrained oil which may rise to the top of the sludge either before or after it is heated. Whether I separate the sludges into grades or remove the acid from the original body of the acid sludge this pumping off of the entrained oil is, preferably, a preliminary step to avoid any possibility of its being combined with the acid under the high temperature employed.

In the accompanying drawing I have illustrated a form of still which may be conveniently used. In the drawing 1 represents the furnace of the still. 2 the stack and 3 the body or boiler of the still.

4 is an inlet for the sludge and 5 an inlet for steam or air, or both, the discharge being through perforated coils in the bottom.

6, 7 and 8 are vapor outlets.

9 is a discharge pipe for the resulting pitch or asphalt.

Having thus fully described my invention, what I claim is:—

1. The process of treating petroleum sludge produced by refining petroleum distillates and their derivatives to secure pitch or analogous derivatives, which consists in removing the major portion of the acid and then heating.

2. The process of treating petroleum sludge produced by refining petroleum distillates and their derivatives to secure pitch or analogous derivatives, which consists in digesting the sludge until the major part of the acid has been removed, and then slowly heating.

3. The process of treating petroleum sludge produced by refining petroleum distillates to secure pitch or analogous derivatives, which consists in digesting the sludge until the major part of the acid has been removed, then heating beyond the condensing point of steam, and then digesting by a steam spray until the mass is converted into pitch.

4. The process of treating petroleum sludge produced by refining petroleum distillates and their derivatives to secure pitch or analogous derivatives, which consists in pumping off any mechanically entrained oil which may rise to the top, digesting the sludge until the major part of the acid has been removed, then heating beyond the condensing point of steam, and then heating by a steam spray until the mass is converted into pitch.

5. The process of treating petroleum acid sludge to secure pitch, asphalt or analogous derivatives, which consists in digesting the sludge with an acid wash and then heating.

In testimony whereof I affix my signature, in presence of two witnesses.

JOHN LATHROP GRAY.

Witnesses:
FRANK B. MASON,
THOMAS TARVIN GRAY.